Southwick & Grandy,
Cutting Files,

Nº 37,725. Patented Feb. 17, 1863.

Witnesses: Inventors:

UNITED STATES PATENT OFFICE.

A. B. SOUTHWICK AND H. E. GRANDY, OF BALLARDVALE, MASSACHUSETTS, ASSIGNORS TO THE WHIPPLE FILE MANUFACTURING COMPANY, OF SAME PLACE.

IMPROVEMENT IN MACHINES FOR CUTTING RASPS.

Specification forming part of Letters Patent No. 37,725, dated February 17, 1863.

*To all whom it may concern:*

Be it known that we, A. B. SOUTHWICK and H. E. GRANDY, both of Ballardvale, in the county of Essex and State of Massachusetts, have invented certain Improvements in Machines for Cutting Rasps, of which the following is a full, clear, and exact description, reference being had to the accompanying drawings, making part of this specification, in which—

Figures 2, 3:
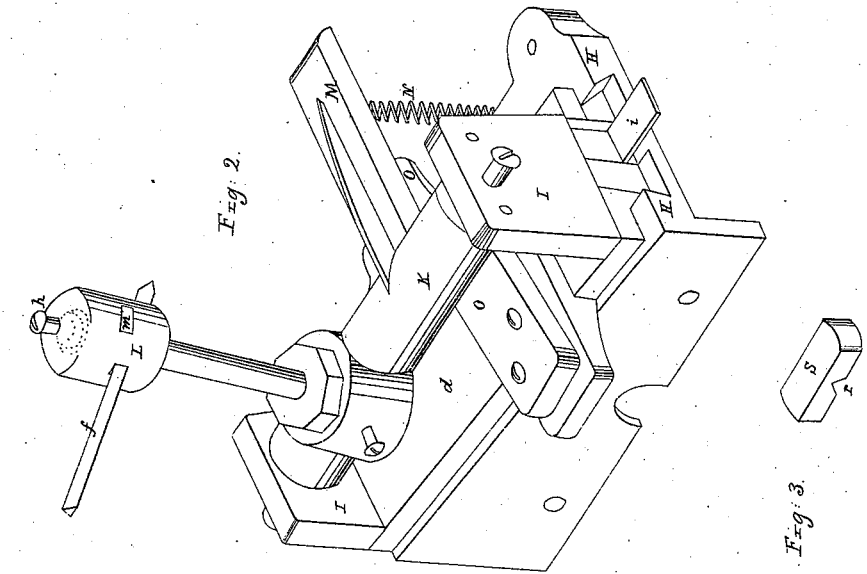
Figure 1:
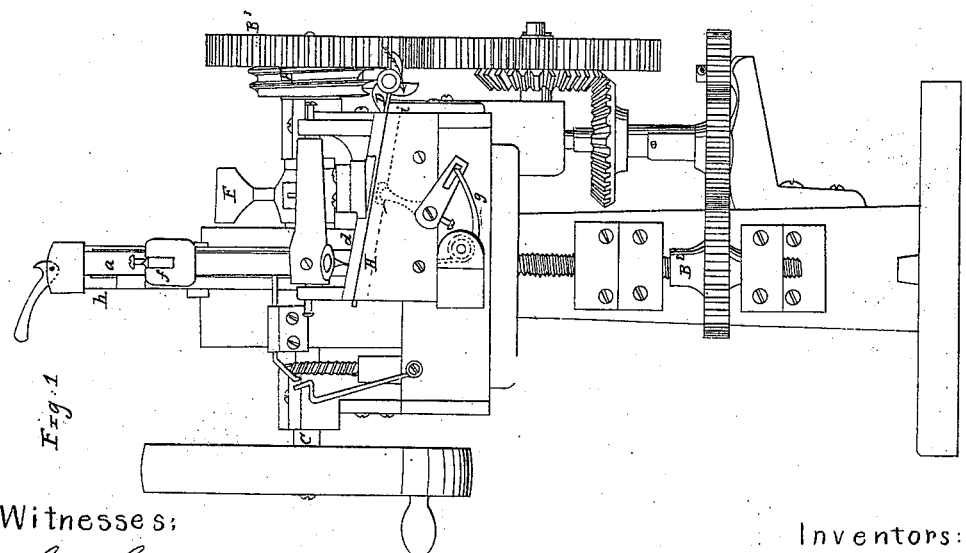

Figure 1 is a front elevation of a machine for cutting rasps, invented by J. S. and David Shattuck, and having our improvements attached; Fig. 2, a perspective view of our improved cutter-carriage as it is applied to the above machine; Fig. 3, a view of the notched bar by which the cutter is secured in its head.

In the machine represented in Fig. 1 the blank is fed continuously and uninterruptedly up by means of a screw, B, to the upper end of which is secured the holder $b$, which carries the blank. The screw is operated by a nut, $B^2$, which is connected by intermediate gearing with a wheel, $B^3$, upon the driving-shaft C. The cutter $f$ is thrown by a spring to give the blow and is moved past the face of the blank to place the teeth in rows across it by cams D upon a shaft driven by the worm E on the driving-shaft. These cams operate upon an arm, $i$, projecting from the cutter-carriage $d$, which is brought back after having completed a line of teeth across the rasp by a spring, $g$. The shaft C also carries the cams F, which raise the cutter preparatory to its being thrown by its spring.

Our improvements are exclusively upon the cutter carriage and upon the cutter-head, and will now be particularly described.

As the blank in this machine is fed continuously and vertically, it is manifest if the cutter-carriage move in a horizontal plane while the blank is rising, that the teeth will not be arranged in lines perpendicular to a line running lengthwise through the center of the rasp. To accomplish this arrangement of the teeth is the object of the first part of our invention, which consists in raising the cutter-carriage as it moves across the blank by causing it to run upon inclined stationary ways, the inclination of the ways being such that the upward motion of the cutter shall be just equal to the upward feed of the blank. The inclined ways H, upon which the cutter-carriage runs, are secured to the table or bench of the machine. From the bottom of the carriage rises two standards, I, which carry a shaft, K, that pivots freely upon centers or in bearings upon the standards. The cutter-head L is secured to the extremity of an arm projecting from this shaft. Another arm, M, projecting from the same shaft, is raised by the cams F preparatory to each cut, and the cutter is thrown by a spring, N, as seen in Fig. 2. As the arm M falls it strikes against a spring, O, secured to the carriage, which raises the cutter from off the blank after it has formed a tooth.

A difficulty has been experienced in machines of this class for want of some efficient method of securing the cutter to its head. Where wedges were used for the purpose they were apt to be jarred loose by the frequent and violent concussions to which they were exposed, while the form of the cutter rendered it still more difficult to hold it steadily and in the right position. To remedy this difficulty, we have invented the following device: The cutter, which is made by pointing a three-sided bar of steel, is passed through a square mortise in the cutter-head. A second mortise, $m$, at right angles with the former and intersecting it, is then made through the head, and into this mortise is placed a bar or block, S, Fig. 3, of steel, having a triangular notch, $r$, cut in it to accommodate the cutter, the surfaces of the notch where they bear upon the cutter being cut with teeth like those of a file. The block S is forced down upon the cutter by the screw $h$. By this means the cutter is held firmly in the position required and may be speedily removed or replaced.

What we claim as our invention, and desire to secure by Letters Patent, is—

1. The inclined ways H, in connection with the cutter-carriage, as set forth, for the purpose specified.

2. The method herein described of securing the cutter to its head by means of the mortise $m$, the notched bar S and the screw $h$, operating as described.

A. B. SOUTHWICK.
H. E. GRANDY.

Witnesses:
SAM. COOPER,
P. E. TESCHEMACHER.